Patented Dec. 14, 1926.

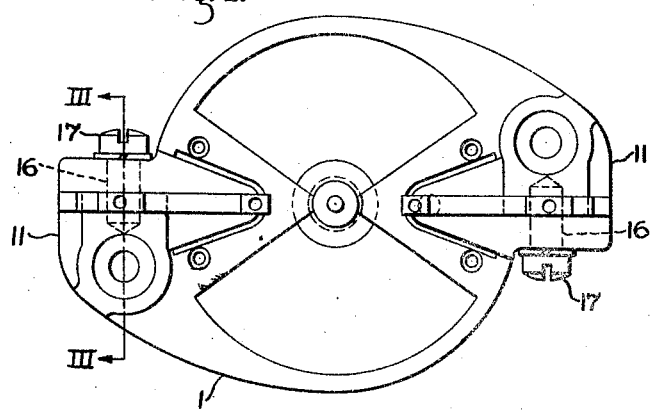
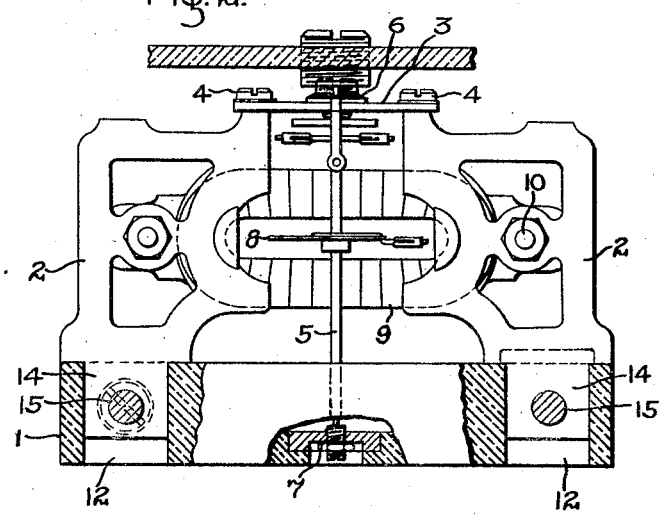
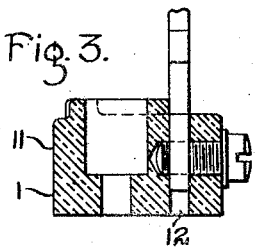

1,610,557

UNITED STATES PATENT OFFICE.

PAUL KREISEL, OF NEWARK, NEW JERSEY, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed May 12, 1923. Serial No. 638,619.

My invention relates to electrical measuring instruments and particularly to supporting means for the operating shafts thereof.

One object of my invention is to provide means of the above-indicated character for accurately positioning the instrument shaft.

Another object of my invention is to compensate for variations between the base member and intermediate supports of a meter shaft bearing.

Another object of my invention is to so construct an instrument as to compensate for variations in the mold in which the instrument base member is formed.

A further object of my invention is to provide means for so securing the supporting standards or brackets of a meter shaft bearing to a base member as to tend to move the brackets in the same direction around the shaft, thereby retaining the bearing in fixed position and automatically compensating for certain discrepancies between the brackets and the base member.

Heretofore, it has been usual, in a certain type of electrical measuring instrument, to provide a base member upon which a pair of brackets was supported and between which a bridging member extended to support a bearing member for the meter shaft.

In providing a molded insulating base member for such instrument, in accordance with the copending application of P. MacGahan, Serial No. 641,071, filed May 24, 1923 for electrical measuring instruments, and assigned to the Westinghouse Electric & Manufacturing Company, it has been found that the mold by which the base member is formed becomes worn with repeated use, thereby varying the position of the brackets relatively to the shaft.

In practicing my invention, I provide means for so mounting the supporting brackets for the instrument shaft bearing on the base member as to tend to move the brackets around the meter shaft in the same direction. This construction retains the bearing member for the shaft in a fixed position rather than moving it off center as would ordinarily be occasioned by discrepancies between the fitted portions of the brackets and the base member.

Figure 1 of the accompanying drawings is a plan view of a portion of an electrical measuring instrument constructed in accordance with my invention, showing only the base member and the supporting brackets for the shaft bearing.

Fig. 2 is a view, partially in side elevation and partially in section, of the device shown in Fig. 1 together with certain other parts of the instrument not shown in Fig. 1, and Fig. 3 is a detailed sectional view taken along the line III—III of Fig. 1.

An instrument constructed in accordance with my invention comprises, in general, a preferably molded insulating base member 1, a pair of standards or brackets 2 mounted on the base member 1, a bridging member 3 joining the brackets 2 and secured thereto, as by screws 4, a shaft 5, a bearing member 6 for the shaft 5 mounted in the bridging member 3 and a bearing member 7 for the shaft 5 mounted in the base member 1. An armature disk 8 that is mounted on the shaft 5 and an actuating coil 9 that is mounted on the brackets 2, as by screws 10, are also provided.

The base member 1 is molded to be of substantially cylindrically box-like shape having diametrically opposite projections 11 in which slots or recesses 12 are provided for the reception of lugs 14 at the lower ends of the brackets 2. Openings 15 in the lugs 14 register with openings 16 in the portions 11 for the reception of screws 17, which extend in opposite parallel directions relatively to each other and in the same direction around the shaft 5.

Wear, in the parts of the mold which form the recesses 12, causes discrepancies in the fit between the brackets 2 and the base member 1, thereby causing the brackets to become out of alignment, or, in other words, not diametrically opposite, as shown in Fig. 1. This would ordinarily cause the bearing member 6 to become out of alignment with the bearing member 7 to render the instrument inaccurate, if not inoperative.

However, by the above described arrangement, such discrepancies are compensated for by reason of the fact that the brackets 2 tend to move in the same direction around the shaft.

When sufficient wear occurs, the brackets during assembly, will move slightly in the same direction about the shaft, causing the ends of the bridge member 3 to turn about the axis of the shaft 5 and to thereby retain the bearing member 6 in fixed position.

While I have shown and described a particular form of my invention, changes may be effected therein without departing from the spirit and scope thereof, as set forth in the appended claims.

I claim as my invention:

1. An instrument comprising a shaft, a base member, means providing a bearing for the shaft mounted on the base member, and means for securing said bearing means in position and tending to move the same about the axis of the shaft to a limiting position.

2. An instrument comprising a shaft, a base member having substantially radially-opposite portions, a pair of standards for supporting the shaft and means for securing the standards in position on said portions and tending to move the standards in the same direction around the shaft.

3. An instrument comprising a shaft, a base member having substantially radially-opposite vertical-surface portions, a pair of standards for supporting the shaft and means for securing the standards in position and tending to move the same in the same direction around the shaft against said vertical surfaces.

4. An instrument comprising a shaft, a base member, a pair of standards or brackets for supporting the shaft and means for securing the brackets in position and tending to move them in the same direction around the shaft.

5. An instrument comprising a shaft, a base member, a pair of standards or brackets mounted on the base member, a bearing structure for the shaft bridged between the brackets and means for securing the brackets in position and tending to move them in the same direction around the shaft.

6. An instrument comprising a shaft, a base member, a pair of standards or brackets mounted on the base member, a bearing structure for the shaft bridged between the brackets, and means for securing the brackets in position, and tending to move the bridge around the axis of the shaft.

In testimony whereof, I have hereunto subscribed my name this 7th day of May 1923.

PAUL KREISEL. [L. S.]